(12) United States Patent
Wang et al.

(10) Patent No.: US 10,330,972 B2
(45) Date of Patent: Jun. 25, 2019

(54) TRANSMISSIVE LIQUID CRYSTAL PANEL AND 3D PRINTER

(71) Applicant: Shanghai Tianma Micro-Electronics Co., Ltd., Shanghai (CN)

(72) Inventors: Chen Wang, Shanghai (CN); Jie Chen, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/831,943

(22) Filed: Dec. 5, 2017

(65) Prior Publication Data

US 2019/0018279 A1 Jan. 17, 2019

(30) Foreign Application Priority Data

Jul. 13, 2017 (CN) .......................... 2017 1 0571113

(51) Int. Cl.
  *G02F 1/1335* (2006.01)
  *G02F 1/1362* (2006.01)
  *G02F 1/017* (2006.01)

(52) U.S. Cl.
  CPC ........ *G02F 1/133512* (2013.01); *G02F 1/017* (2013.01); *G02F 1/136209* (2013.01); *G02F 2001/01791* (2013.01)

(58) Field of Classification Search
  CPC ......... G02F 1/133512; G02F 1/136209; G02F 1/017; G02F 2001/01791
  See application file for complete search history.

(56) References Cited

U.S. PATENT DOCUMENTS

| 2013/0242228 A1* | 9/2013 | Park | ................. | G02F 1/133617 349/61 |
| 2014/0132890 A1* | 5/2014 | Zhang | ............... | G02F 1/133514 349/69 |

(Continued)

FOREIGN PATENT DOCUMENTS

| CN | 103226260 A | 7/2013 |
| CN | 103293745 A | 9/2013 |

(Continued)

OTHER PUBLICATIONS

Chinese Office Action for corresponding Chinese Application Serial No. 201710571113.0, dated Sep. 25, 2018, pp. 1-21.

(Continued)

*Primary Examiner* — Jia X Pan
(74) *Attorney, Agent, or Firm* — Tarolli, Sundheim, Covell & Tummino LLP

(57) ABSTRACT

Transmissive liquid crystal panel and 3D printer including the same, the panel includes: a first substrate including a plurality of data lines and scan lines, data lines intersecting with scan lines to define a plurality of pixels; a second substrate; a liquid crystal layer located between the first and second substrate; a black matrix defining a plurality of aperture areas corresponding to the pixels; a monochromatic quantum dot layer covering the aperture areas, the monochromatic quantum dot layer being excitable under near ultraviolet light to generate light having a wavelength in a range of 385 nm-420 nm. The panel does not use chromatic filter layer, which improves transmittance of the panel with respect to near ultraviolet light, when the panel is applied in 3D printer, photographic efficiency of photosensitive resin and printing speed are improved, and utilization of near-ultraviolet light emitted by the backlight source is improved.

17 Claims, 5 Drawing Sheets

(56) References Cited

U.S. PATENT DOCUMENTS

| | | | | |
|---|---|---|---|---|
| 2014/0168576 A1* | 6/2014 | Lee | ......................... | H01J 29/90 349/71 |
| 2015/0002788 A1* | 1/2015 | Guo | .................. | G02F 1/133603 349/69 |
| 2015/0145405 A1* | 5/2015 | Yang | ................... | H01L 27/3211 313/498 |
| 2015/0212352 A1* | 7/2015 | Guo | .................. | G02F 1/133617 349/71 |
| 2015/0323832 A1* | 11/2015 | Guo | .................. | G02F 1/133514 349/61 |
| 2018/0072942 A1* | 3/2018 | Yamada | ................. | C09K 11/08 |

FOREIGN PATENT DOCUMENTS

| | | |
|---|---|---|
| CN | 104360536 A | 2/2015 |
| CN | 104669619 A | 6/2015 |
| CN | 105353555 A | 2/2016 |

OTHER PUBLICATIONS

CN OA and English translation thereof, dated Feb. 2, 2019 for corresponding CN Application No. 201710571113.0.

\* cited by examiner

TRANSMISSIVE LIQUID CRYSTAL PANEL AND 3D PRINTER

CROSS-REFERENCE TO RELATED APPLICATIONS

The present application claims priority to Chinese Patent Application No. 201710571113.0, filed on Jul. 13, 2016, the content of which is incorporated herein by reference in its entirety.

TECHNICAL FIELD

The present disclosure relates to the field of 3D printing technologies and, in particular, to a transmissive liquid crystal panel and a 3D printer.

BACKGROUND

A rapid prototyping technology (also called Rapid Prototyping Manufacturing, RPM), also known as 3D printing, is a high-tech manufacturing technology based on a material accumulation method. This technology can manufacture an entity or an entity model through the shaping equipment adopting the material accumulation method, according to three-dimensional model data of the parts or the object. With the advantages of significant reduction in production costs, utilization improvement in raw material and energy, customization according to demands, significant saving in product production time, etc., the 3D printing technology gradually comes into public view and gets a rapid development in recent years.

The basic principle of the 3D printing is: processing layer by layer, and shaping by stacking, that is, generating the 3D entity by stacking material layer by layer. In the 3D printing process, firstly the 3D model of the object to be printed is obtained by manners of designing, scanning, etc. through a computer, and then a series of digital slices are completed along a certain direction by a computer aided design technology (such as CAD), and then the information of these slices are transferred to a 3D printer, a computer generates a machine instruction based on the slices, and the 3D printer prints a thin layer based on the machine instruction, continuous thin layers are stacked until a solid object is shaped, forming a three-dimensional entity, and then the 3D printing is completed.

SUMMARY

The present disclosure is intended to provide a transmissive liquid crystal panel and a 3D printer so as to solve the technical problems of high cost in existing 3D printers, low near ultraviolet light transmittance and high dark-state transmittance when a liquid crystal display is used for 3D printing.

The present disclosure provides a transmissive liquid crystal panel, including: a first substrate, the first substrate comprising a plurality of data lines and a plurality of scan lines, the plurality of data lines intersecting with the plurality of scan lines to define a plurality of pixels; a second substrate; a liquid crystal layer located between the first substrate and the second substrate; a black matrix, the black matrix defining a plurality of aperture areas corresponding to the plurality of pixels; a monochromatic quantum dot layer, the monochromatic quantum dot layer covering the aperture areas of the black matrix and being excitable under near ultraviolet light to generate light having a wavelength in a range of 385 nm-420 nm.

In addition, the present disclosure further provides a 3D printer, including a backlight source and the transmissive liquid crystal panel described above, the backlight source emits near ultraviolet light having a single wavelength, and the near ultraviolet light emitted by the backlight source passes through the transmissive liquid crystal panel, so that the light having the wavelength in the range of 385 nm-420 nm can be generated.

Compared with the related art, technical solutions provided by the present disclosure have the following advantages: the transmissive liquid crystal panel provided by the present disclosure including: a first substrate including a plurality of data lines and scan lines, the data lines intersecting with the scan lines to define a plurality of pixels; a second substrate; a liquid crystal layer located between the first substrate and the second substrate; a black matrix defining a plurality of aperture areas corresponding to the pixels; a monochromatic quantum dot layer covering the aperture areas, the monochromatic quantum dot layer being excitable under near ultraviolet light to generate light having a wavelength in a range of 385 nm-420 nm. Compared with the liquid crystal display panel in the related art, the transmissive liquid crystal panel provided by embodiments of the present disclosure uses a monochromatic quantum dot layer instead of a chromatic filter layer, and the monochromatic quantum dot layer is excitable under near ultraviolet light to generate light having a wavelength in a range of 385 nm-420 nm, which improves transmittance of the transmissive liquid crystal panel with respect to near ultraviolet light, when the transmissive liquid crystal panel is applied in a 3D printer, the photographic efficiency of photosensitive resin and the printing speed are improved, and the utilization of the near-ultraviolet light emitted by the backlight source is improved.

BRIEF DESCRIPTION OF DRAWINGS

With detailed description of non-limiting embodiments with reference to the following drawings, other features, purposes and advantages of the present disclosure will be clearer.

DESCRIPTION OF EMBODIMENTS

Figure 1:
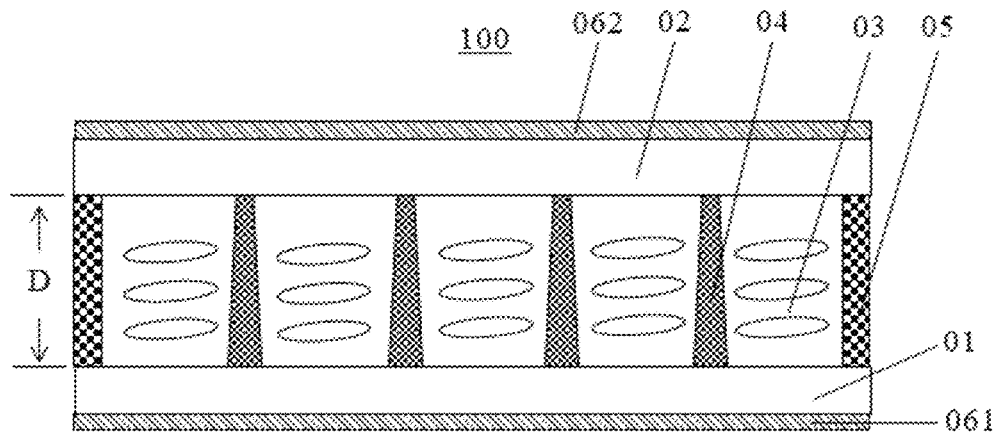
FIG. 1 illustrates a cross-sectional view of a transmissive liquid crystal panel provided by an embodiment of the present disclosure.

The present disclosure will be further described in detail with reference to the accompanying drawings and embodiments as follows. It should be understood that the specific embodiments described herein are merely for explaining the present disclosure but not to limiting the present disclosure. Also, it should be noted that, for ease of description, only parts, rather than all structures, of the present disclosure are shown in the accompanying drawings. Techniques, methods, and apparatus known to those skilled in the art may not be discussed in detail, but where appropriate, the techniques, methods, and apparatuses should be considered as a part of the specification.

For all the examples shown and discussed herein, any specific value should be construed as merely illustrative but not as limitation. Thus, other examples of exemplary embodiments may have different values.

It should be noted that similar reference numerals and letters denote similar items in the accompanying drawings, and therefore, once an item is defined in an accompanying drawing, there is no need for further discussion in the following accompanying drawings.

The present disclosure provides a transmissive liquid crystal panel, as shown in FIG. 1, FIG. 1 is a cross-sectional view of a transmissive liquid crystal panel provided by an embodiment of the present disclosure, the transmissive liquid crystal panel 100 includes a first substrate 01, a second substrate 02 disposed opposite to the first substrate 01, and a liquid crystal layer 03 between the first substrate 01 and the second substrate 02. The first substrate 01 and the second substrate 02 seal the liquid crystal layer 03 in a box formed by the first substrate 01 and the second substrate 02 through frame sealing glue 05 around the periphery. The stability of the thickness of the box is maintained by a plurality of spacers 04 disposed between the first substrate 01 and the second substrate 02.

The box thickness of the transmissive liquid crystal panel 100, namely a thickness D of the liquid crystal layer 03, is preferably 2.5-3.0 μm, so as to reduce the near ultraviolet light transmittance of the transmissive liquid crystal panel 100 in dark state.

The transmissive liquid crystal panel 100 further includes a lower polarizer 061 located at a side of the first substrate 01 away from the liquid crystal layer 03, and an upper polarizer 062 located at a side of the second substrate 02 away from the liquid crystal layer 03.

Further, the first substrate 01 includes a plurality of parallel data lines and a plurality of parallel scan lines, the plurality of parallel data lines intersects with the plurality of parallel scan lines to define a plurality of pixels; the transmissive liquid crystal panel 100 further includes a black matrix and a monochromatic quantum dot layer, the black matrix defines a plurality of aperture areas corresponding to the pixels described above, the monochromatic quantum dot layer covers the aperture areas of the black matrix, and the monochromatic quantum dot layer can be excited under near ultraviolet light to generate light having a wavelength in a range of 385 nm-420 nm. In the present disclosure, the above black matrix and monochromatic quantum dot layer may be located on the first substrate 01 or on the second substrate 02.

The monochromatic quantum dot layer can be formed, for example, by coating a layer of quantum dot colloid on the base substrate of the first substrate or the second substrate. Specifically, the monochromatic quantum dot colloid is coated on the base substrate, and after being cured, the monochromatic quantum dot layer is formed. Meanwhile, a monochromatic quantum dot layer capable of transmitting near ultraviolet light having different wavelengths can be obtained by controlling the particle size of the monochromatic quantum dot material according to needs. When the transmissive liquid crystal panel is used in the 3D printer, the monochromatic quantum dot layer manufactured by the above-described method can be excited under near ultraviolet light to generate near ultraviolet light having a required wavelength, according to the requirements for curing of the 3D printing material.

In the present embodiment, the monochromatic quantum dot layer can be excited under near ultraviolet light to generate light having a wavelength in a range of 385 nm-420 nm.

Further, the monochromatic quantum dot layer can be excited under near ultraviolet light to generate light having a wavelength of 385 nm, 405 nm or 420 nm.

Figure 2:
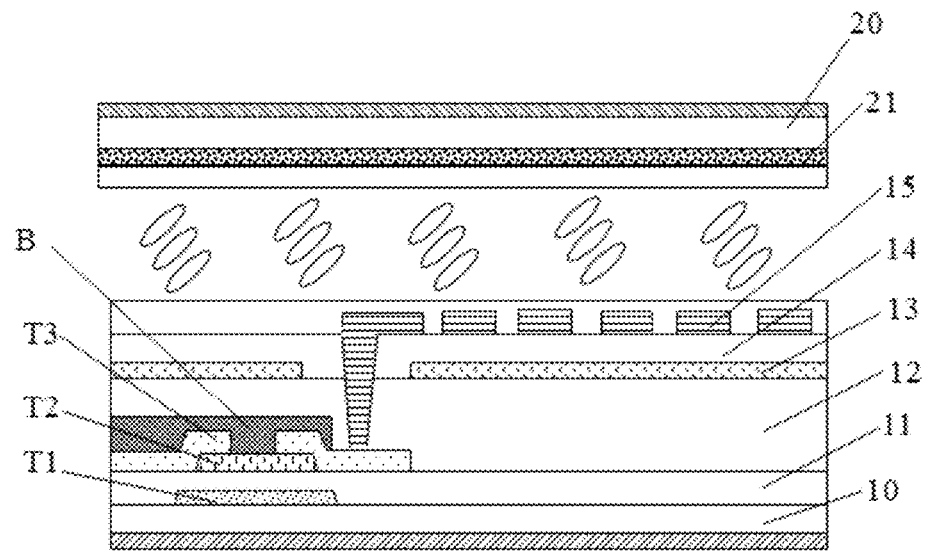
FIG. 2 illustrates a partial cross-sectional view of a transmissive liquid crystal panel provided by another embodiment of the present disclosure.
Figure 3:
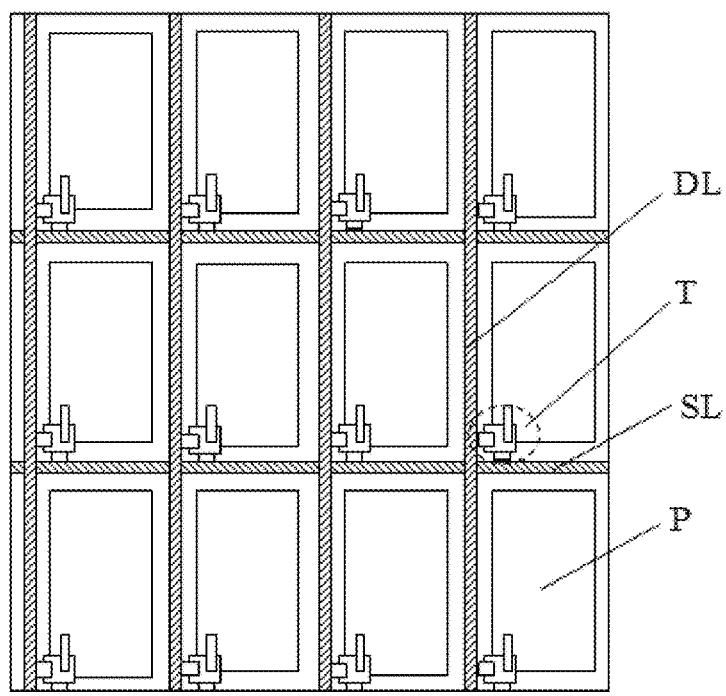
FIG. 3 illustrates a structural schematic view of pixels of the transmissive liquid crystal panel shown in FIG. 2.
Figure 4:
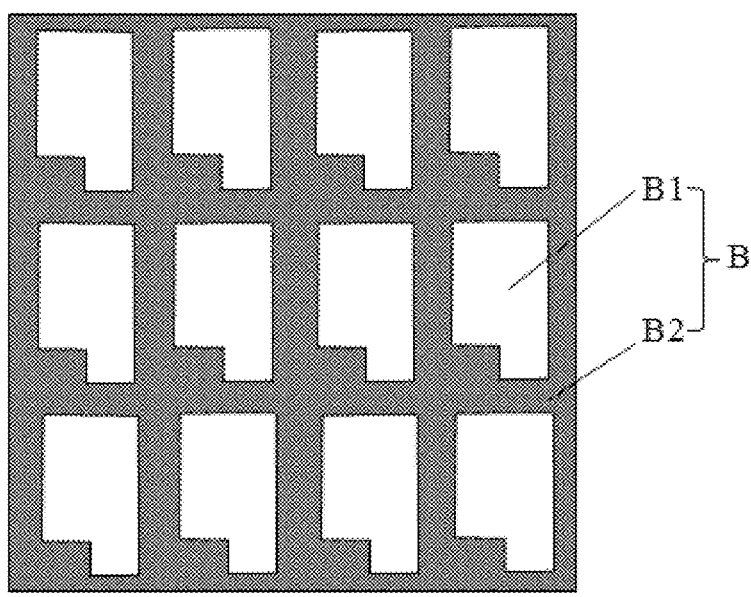
FIG. 4 illustrates a schematic view of a black matrix of the transmissive liquid crystal panel shown in FIG. 2.

In an embodiment of the present disclosure, the above-described monochromatic quantum dot layer is located on the second substrate 02 and the black matrix is located on the first substrate 01, as shown in FIGS. 2, 3 and 4, wherein FIG. 2 is a partial cross-sectional view of a transmissive liquid crystal panel provided by another embodiment of the present disclosure, FIG. 3 is a structural schematic view of pixels of the transmissive liquid crystal panel shown in FIG. 2, FIG. 4 is a schematic view of a black matrix of the transmissive liquid crystal panel shown in FIG. 2. In the present embodiment, the monochromatic quantum dot layer 21 is located on the second substrate 02, the second substrate 02 includes a second base substrate 20, the monochromatic quantum dot layer 21 is located at a side of the second base substrate 20 facing the liquid crystal layer 03, the monochromatic quantum dot layer 21 can be excited under near ultraviolet light to generate light having a wavelength in a range of 385 nm-420 nm.

The first substrate 01 is an array substrate, in the present embodiment, the first substrate 01 includes a plurality of parallel data lines DL and a plurality of parallel scan lines SL, the plurality of parallel data lines DL intersects with the plurality of parallel scan lines SL to form a plurality of pixels P arranged in an array. Each pixel P includes at least one scan line SL, at least one data line DL, at least one semiconductor thin film transistor T, and at least one pixel electrode 15. In the present embodiment, the scan line and the data line can be selected from, for example, metallic materials, but the present disclosure is not limited thereto, the scan line and the data line can also be selected from alloy, nitride of metallic material, oxide of metallic material, oxynitride of metallic material, or stacking layers of metallic material and of other conductive materials.

Each semiconductor thin film transistor T includes a gate electrode T1, a semiconductor channel T2 overlapping the gate electrode T1, a gate insulation layer 11 disposed between the gate electrode T1 and the semiconductor channel T2, and a source-drain electrode T3 respectively electrically connected with two sides of the semiconductor channel T2, the source-drain electrode T3 including a source electrode and a drain electrode. The gate electrode T1 of the semiconductor thin film transistor T is electrically connected with the scan line SL, and the source electrode of the semiconductor thin film transistor T is electrically connected with the data line DL, and the pixel electrode 15 is electrically connected with the drain electrode of the semiconductor thin film transistor T. In the present embodiment, the semiconductor thin film transistor is a back-channel semiconductor thin film transistor, the gate electrode T1 is located between the semiconductor channel T2 and the first base substrate 10, and the gate electrode T1 is made of non-transparent metallic material, alloy, nitride of metallic material, oxide of metallic material, oxynitride of metallic material, stacking layer of metallic material with other conductive material, etc., which can effectively block light from the first base substrate direction so as to protect the semiconductor channel of the semiconductor thin film transistor from being influenced by near ultraviolet light and/or ultraviolet light, thereby improving the performance stability of the semiconductor thin film transistor and improving the service life of the semiconductor thin film transistor.

Further, the first substrate 01 further includes a planarization layer 12 provided to cover each data line 10 and each source-drain electrode T3, a common electrode 13 arranged on the planarization layer 12, and a plurality of pixel electrodes 15 arranged in a matrix on the common electrode 13, an insulation layer 14 is provided between the common electrode 13 and the pixel electrodes 15 so that the common electrode 13 is insulated and spaced from the pixel electrode 15. A horizontal electric field is generated between the common electrode and the pixel electrodes under the control of the driving signal, which drives to change the state of the liquid crystal molecules of the liquid crystal layer.

The planarization layer is, for example, an insulation film with light transparency, which is planarized so that the pixel electrodes located above it can be formed into a flat shape and the planarization is implemented in a manner that, the metal wiring (e.g., the scan lines, the data lines, etc.), the semiconductor thin film transistor, etc. located at its lower side can be absorbed and form a ladder. The planarization layer is provided with a through hole. The pixel electrodes are located at a side of the planarization layer away from the semiconductor thin film transistor and the metal wiring, and are electrically connected with the drain electrode of the semiconductor thin film transistor via the through hole.

In the present embodiment, the material of the pixel electrodes may be, for example, a transparent conductive material such as indium tin oxide, indium zinc oxide, aluminum tin oxide, aluminum zinc oxide, indium germanium zinc oxide or the like. The material of the planarization layer may be an inorganic material (e.g., silicon oxide, silicon nitride, silicon oxynitride, other appropriate materials, or a stacking layer of at least two above-described materials), an organic material, or other appropriate materials, or the combination of the above-described materials.

In the present embodiment, the gate electrode T1 and the scan line SL are selectively formed by the same film layer, the source-drain electrode T3 and the data line DL are selectively formed by the same film layer. In other embodiments, however, the present disclosure is not limited to these, and the film layer relationship between the gate electrode and the scan line and/or the film layer relationship between the source-drain electrode and the data line can be appropriately designed in other manners according to the actual requirements.

Further, the first substrate 01 further includes a black matrix B, the black matrix B includes a light-shading area B2 and an aperture area B1. The light-shading area B2 is correspondingly arranged on the first substrate 01 at the area where the metal wiring and the semiconductor thin film transistor T are located. The metal wiring may be, for example, the above-described scan lines, the data lines and the like. The aperture area B1 is arranged corresponding to the pixel P. In the present disclosure, the black matrix B is located between the semiconductor thin film transistor T and the liquid crystal layer, optionally between a film layer, where the source-drain electrode and the data line are located, and the planarization layer, which on the one hand, defines a plurality of pixels and prevents light emitted from different pixels from producing a light-mixing phenomenon, on the other hand, is used to prevent the light, which is reflected from the liquid crystal layer back to the first substrate 01, from reaching the semiconductor channel of the semiconductor thin film transistor T, so as to protect the semiconductor channel of the semiconductor thin film transistor from being influenced by near ultraviolet light and/or ultraviolet light, thereby improving the performance stability of the semiconductor thin film transistor and improving the service life of the semiconductor thin film transistor.

For example, the above-described array substrate can be manufactured by the following method: firstly, a first base substrate is provided, and then a gate electrode and a scan line, a gate insulation layer, a semiconductor channel layer, a source-gate electrode and a data line are sequentially formed on the first base substrate by a patterning technology; and then, a black matrix layer is deposited on the first base substrate after completing the above steps, a part of the black matrix located in the pixel area is removed to form the aperture area and the light-shading area; then, a planarization layer, a common electrode and a pixel electrode are sequentially formed, and the position of the pixel electrode corresponds to the aperture area of the black matrix. The black matrix may have the function of a passivation layer, optionally made of an acyclic sense optically active resin or a polyimide non-photosensitive optical resin, or a combination thereof; the black matrix which may have the function of the passivation layer may also be a chromium oxide or a molybdenum oxide, or a combination thereof.

In the present embodiment, since the first substrate 01 is an array substrate, the black matrix B is provided on the array substrate, the requirement of the transmissive liquid crystal panel on the box precision is significantly reduced, and meanwhile the light-shading effect for the semiconductor thin film transistor is achieved, so as to protect the semiconductor channel of the semiconductor thin film transistor from being influenced by near ultraviolet light and/or ultraviolet light, thereby improving the performance stability of the semiconductor thin film transistor and improving the service life of the transmissive liquid crystal panel.

In the present embodiment, the black matrix is located on the first substrate, optionally, between the film layer, where the source-drain electrode and the data line are located, and the planarization layer, which defines the pixels and prevents the light-mixing phenomenon, and also protects the semiconductor thin film transistor; of course, in other embodiments, it can also be arranged that, the black matrix is located on the second substrate, for example, located at a side of the second base substrate facing the liquid crystal layer, and the black matrix includes a plurality of light-shading areas and a plurality of aperture areas, the plurality of aperture areas is arranged in a matrix and corresponds to a plurality of pixels formed on the first substrate so as to prevent lights emitted from different pixels from producing light-mixing phenomenon. Meanwhile a plurality of light-shading layers is formed on the first substrate, which is located between the film layer, where the source-drain electrode and the data line are located, and the planarization layer, covering the semiconductor channel of the semiconductor thin film transistor, so as to prevent the light reflected from the liquid crystal layer from reaching the semiconductor channel of the semiconductor thin film transistor, thereby improving the performance stability of the semiconductor thin film transistor and improving the service life of the transmissive liquid crystal panel. The material of the light-shading layer may be for example the same as the material of the black matrix.

A color liquid crystal display in the related art includes a chromatic filter layer, when near ultraviolet light is used as the backlight source, near ultraviolet light usually can only pass through a blue color-resistance layer, transmittance is relatively low, thus loss of light efficiency is very great. The transmissive liquid crystal panel provided by the present embodiment uses a monochromatic quantum dot layer instead of the conventional chromatic filter layer, and this monochromatic quantum dot layer can be excited under near ultraviolet light to generate light having a wavelength in a range of 385 nm-420 nm, which improves the near ultraviolet light transmittance, thereby improving the light energy utilization of the transmissive liquid crystal panel. Meanwhile, compared with the chromatic liquid crystal display in the related art, the present embodiment also reduces box thickness of the transmissive liquid crystal panel, preferably, the box thickness is in a range of 2.5 μm-3.0 μm, the dark-state transmittance of the transmissive liquid crystal panel is reduced, when the transmissive liquid crystal panel is used as a pattern mask, the imaging is clear, for example, when it is used as a graphic mask in 3D printing, near ultraviolet light transmittance in a bright state is improved, and near ultraviolet light transmittance in dark state is reduced, so as to prevent light sensitivity of photosensitive resin at the invalid pattern, the quality of the printed pattern is improved, waste of the photosensitive resin material is reduced, and meanwhile the 3D printing speed is improved.

Figure 5:
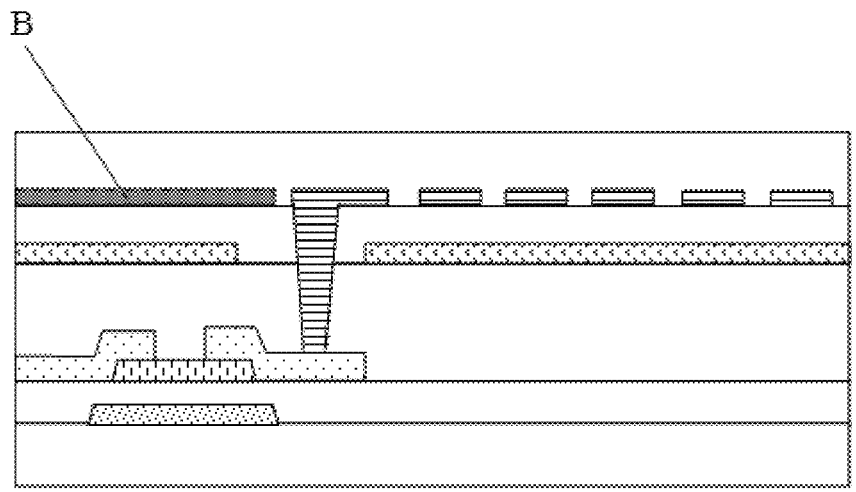
FIG. 5 illustrates a cross-sectional view of an array substrate of a transmissive liquid crystal panel provided by still another embodiment of the present disclosure.

FIG. 5 is a cross-sectional view of an array substrate of a transmissive liquid crystal panel provided by still another embodiment of the present disclosure. In the present embodiment, the structure of the transmissive liquid crystal panel is similar to that of the transmissive liquid crystal panel provided in FIGS. 2-4. The transmissive liquid crystal panel includes a first substrate, a second substrate disposed opposite to the first substrate, and a liquid crystal layer located between the first substrate and the second substrate, a black matrix is located on the first substrate (i.e., the array substrate), the difference lies in that, the black matrix B is located between the film layer, where the pixels are located, and the liquid crystal layer, for example, the above-described array substrate can be manufactured by the following method: firstly, a first base substrate is provided, and then a gate electrode and a scan line, a gate insulation layer, a semiconductor channel layer, a source-gate electrode and a data line are sequentially formed on this first base substrate by a patterning technology; and then, a planarization layer and a transparent conductive layer are sequentially deposited on the first base substrate after completing the above steps, a pixel electrode graphic is formed by a patterning technology; and then a black matrix layer is deposited and formed by patterning, and covers the position of the semiconductor thin film transistor of the array substrate.

In the present embodiment, the black matrix is manufactured on the array substrate, significantly reducing the requirement of the touch display device on the box precision, meanwhile the black matrix covers the position of the semiconductor thin film transistor of the array substrate, thus preventing the light reflected from the liquid crystal layer from reaching the semiconductor channel of the semiconductor thin film transistor, so as to protect the semiconductor thin film transistor from being influenced by near ultraviolet light, thereby stabilizing the performance of the semiconductor thin film transistor and improving the service life of the semiconductor thin film transistor.

Further, the transmissive liquid crystal panel further includes a monochromatic quantum dot layer, which can be excited under near ultraviolet light to generate light having a wavelength in a range of 385 nm-420 nm. In the present embodiment, the monochromatic quantum dot layer may be located on the first substrate or on the second substrate, which will not be limited herein.

Further, the box thickness of the transmissive liquid crystal panel, namely the thickness of the liquid crystal layer, is preferably 2.5-3.0 μm, so as to reduce the near ultraviolet light transmittance of the transmissive liquid crystal panel in dark state.

Further, the first substrate and the second substrate of the transmissive liquid crystal panel are further provided with an alignment layer, respectively, so as to provide an initial alignment for the liquid crystal molecules of the liquid crystal layer.

Figure 6:
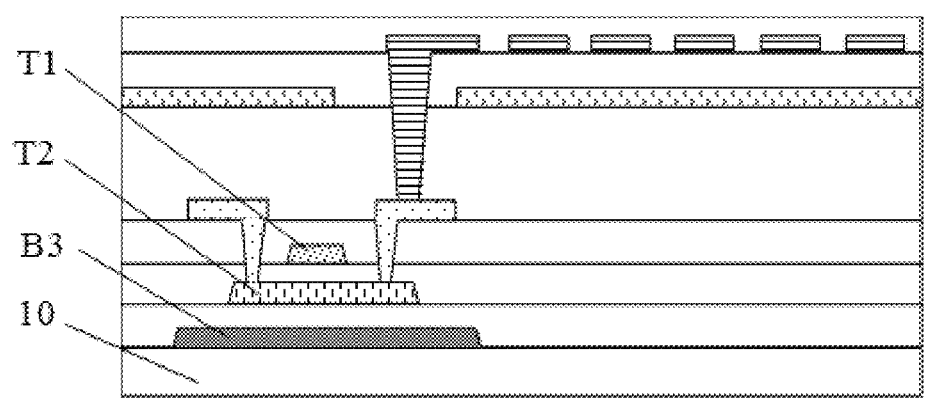
FIG. 6 illustrates a cross-sectional view of an array substrate of a transmissive liquid crystal panel provided by still another embodiment of the present disclosure.

FIG. 6 is a cross-sectional view of an array substrate of a transmissive liquid crystal panel provided by still another embodiment of the present disclosure. In the present embodiment, the structure of the transmissive liquid crystal panel is similar to that of the transmissive liquid crystal panel provided in FIGS. 2-4. The transmissive liquid crystal panel includes a first substrate, a second substrate disposed opposite to the first substrate, and a liquid crystal layer located between the first substrate and the second substrate, the difference lies in that, the semiconductor thin film transistor in the present embodiment is a top-gate semiconductor thin film transistor whose semiconductor channel T2 is located between the gate electrode T1 and the first base substrate 10, meanwhile, a plurality of light-shading layers B3 is formed on the first base substrate 10, and the plurality of light-shading layers B3 is located between the first base substrate 10 and the semiconductor channel T2 and covers the semiconductor channel T2, which blocks light from the first base substrate direction, so as to protect the semiconductor channel of the semiconductor thin film transistor from being influenced by ambient light, thereby improving the service life of the semiconductor thin film transistor. The material of the light-shading layer may be for example the same as the material of the black matrix. In the present embodiment, the black matrix may be located on the first substrate or on the second substrate, which will not be limited herein.

Further, the transmissive liquid crystal panel further includes a monochromatic quantum dot layer, which can be excited under near ultraviolet light to generate light having a wavelength in a range of 385 nm-420 nm. In the present embodiment, the monochromatic quantum dot layer may be located on the first substrate or on the second substrate, which will not be limited herein.

Further, the box thickness of the transmissive liquid crystal panel, namely the thickness of the liquid crystal layer, is preferably 2.5-3.0 μm, so as to reduce the near ultraviolet light transmittance of the transmissive liquid crystal panel in dark state.

Further, the first substrate and the second substrate of the transmissive liquid crystal panel are further provided with an alignment layer, respectively, so as to provide an initial alignment for the liquid crystal molecules of the liquid crystal layer.

Figure 7:
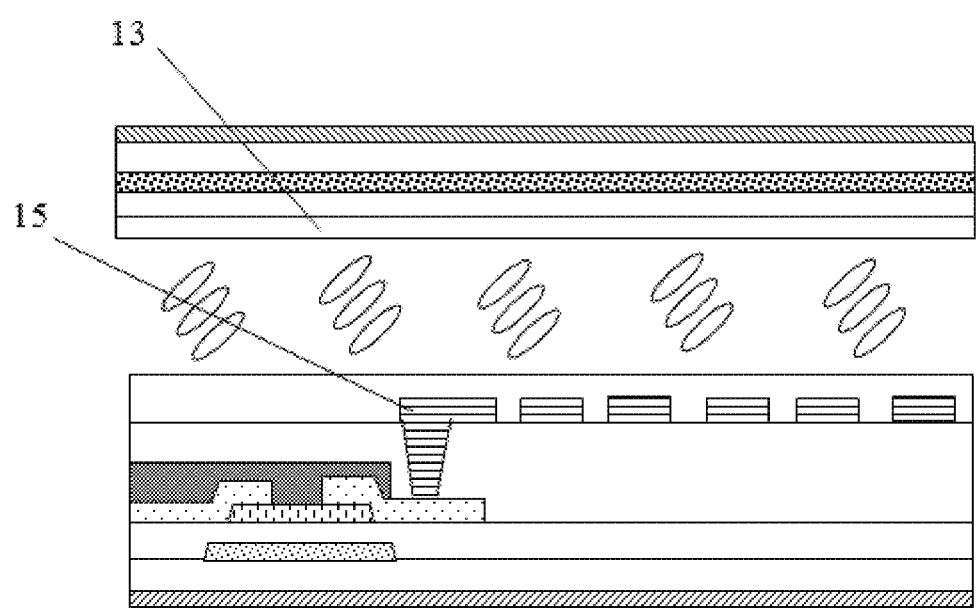
FIG. 7 illustrates a cross-sectional view of a transmissive liquid crystal panel provided by still another embodiment of the present disclosure.

FIG. 7 is a cross-sectional view of a transmissive liquid crystal panel provided by still another embodiment of the present disclosure. In the present embodiment, the structure of the transmissive liquid crystal panel is similar to that of the transmissive liquid crystal panel provided in FIGS. 2-4. The transmissive liquid crystal panel includes a first substrate, a second substrate disposed opposite to the first substrate, and a liquid crystal layer located between the first substrate and the second substrate, a black matrix is located on the first substrate (i.e., the array substrate), the difference lies in that, the transmissive liquid crystal panel provided by FIGS. 2-4 is in a mode of being driven by a horizontal electric field with both the common electrode and the pixel electrode located on the first substrate, the transmissive liquid crystal panel provided by the present embodiment can be in a mainstream display mode selected from electronic control birefringence liquid crystal display (ECB-LCD), twisted nematic liquid crystal display (TN-LCD), and vertical alignment liquid crystal display (VA-LCD), with the pixel electrode 15 located on the first substrate, and the common electrode 13 located on the second substrate. When being driven, a vertical electric field is generated between the pixel electrode 15 and the common electrode 13, and the liquid crystal molecules in the liquid crystal layer undergo a state change under the driving of the vertical electric field, which changes polarization direction of the light passing through the liquid crystal layer. Further, for example, a common electrode connection line may further be provided on the first substrate, and the common electrode located on the second substrate may be for example connected to the common electrode connection line by conductive particles in the frame sealing glue, and a common voltage is supplied to the common electrode by the common electrode connection line.

Further, the transmissive liquid crystal panel further includes a monochromatic quantum dot layer, which can be excited under near ultraviolet light to generate light having a wavelength in a range of 385 nm-420 nm. In the present embodiment, the monochromatic quantum dot layer may be located on the first substrate or on the second substrate, which will not be limited herein.

Further, the box thickness of the transmissive liquid crystal panel, namely the thickness of the liquid crystal layer, is preferably 2.5-3.0 μm, so as to reduce the near ultraviolet light transmittance of the transmissive liquid crystal panel in dark state.

Figure 8:
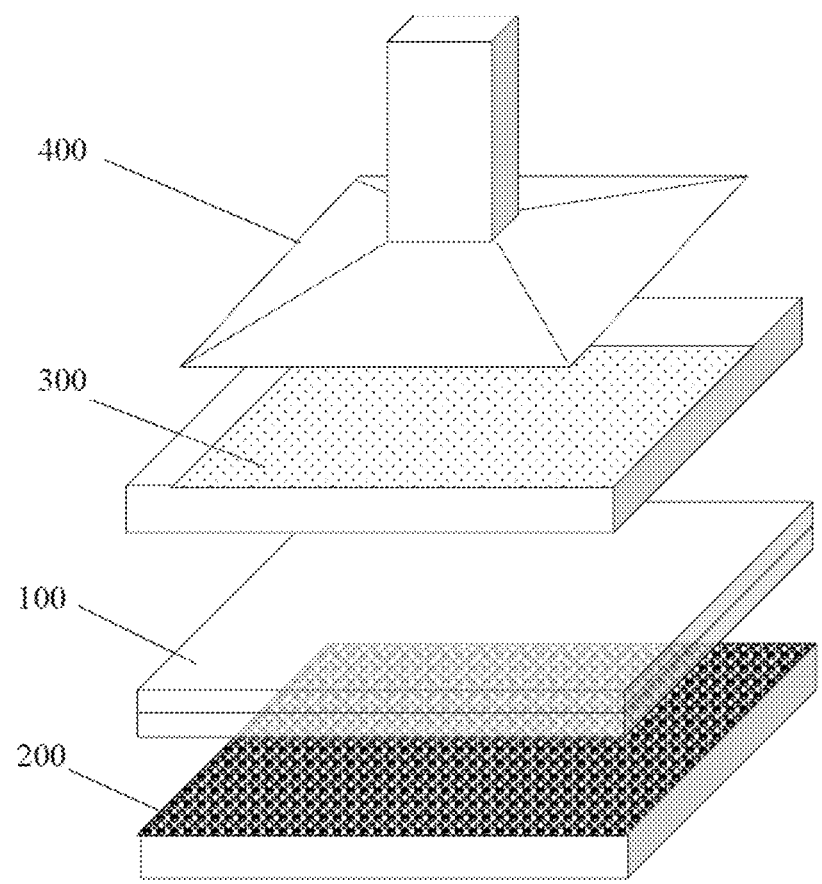
FIG. 8 is a schematic view of a 3D printer provided by an embodiment of the present disclosure.

In addition, the present disclosure further provides a 3D printer including the above-described transmissive liquid crystal panel. FIG. 8 is a schematic view of a 3D printer provided by an embodiment of the present disclosure. The 3D printer includes a backlight source 200, a transmissive liquid crystal panel 100, a shaping slot 300, and a coating structure 400, the transmissive liquid crystal panel 100 is located between the backlight source 200 and the shaping slot 300. The backlight source 200 emits near ultraviolet light having a single wavelength, and the near ultraviolet light having the single wavelength emitted by the backlight source 200 passes through a monochromatic quantum dot layer in the transmissive liquid crystal panel so as to generate light having a wavelength in a range of 385 nm-420 nm. Preferably, the size of the quantum dot in the monochromatic quantum dot layer is selectively set such that light having a wavelength of 385 nm, 405 nm or 420 nm can be generated when the near ultraviolet light having the single wavelength emitted by the backlight source 200 passes through the monochromatic quantum dot layer.

When performing 3D printing, firstly the 3D model of the object to be printed is obtained by designing, scanning, etc. through a computer, and then a series of digital slices are completed along a certain direction by computer aided design technology, and then the information of these slices are transferred to a 3D printer, a certain amount of liquid photosensitive resin is coated into the shaping slot 300 by a coating structure 400 through a spraying head according to the instruction of the slice information; meanwhile, the transmissive liquid crystal panel 100 displays a predetermined pattern on time according to the instruction of the slice information, so that the near ultraviolet light having the single wavelength provided by the backlight source 200 partially passes through the transmissive liquid crystal panel and reaches the liquid photosensitive resin, the liquid photosensitive resin is capable of rapidly carrying out photopolymerization under near ultraviolet light having a certain wavelength and power, the relative molecular mass increases sharply and the material changes from liquid to solid to form a thin layer; when the thin layer is completed, the position of the photosensitive resin where it is not under the near ultraviolet light is still in a liquid state, and then a layer of liquid photosensitive resin is again coated onto the already-shaped thin layer, and then the liquid surface of the photosensitive resin having large viscosity is scraped to be flat by using a scraper, and then by changing the display pattern of the transmissive liquid crystal panel and repeating the above-described shaping process, another thin layer is formed, and then by repeating as such and stacking the continuous thin layers until a solid object is shaped, a three dimensional entity is formed and the 3D printing is completed.

The 3D printer provided by the present embodiment uses the transmissive liquid crystal panel as a shaping mask instead of the laser projector to form a pattern, which is lower in cost than the expensive laser projector, thereby reducing the product cost of the 3D printer and increasing the popularity.

The transmissive liquid crystal panel in the 3D printer provided by the present embodiment uses a monochromatic quantum dot layer instead of the chromatic filter layer in the conventional liquid crystal display panel, and the monochromatic quantum dot layer can be excited under near ultraviolet light to generate light having a wavelength in a range of 385 nm-420 nm, so as to improve the near ultraviolet light transmittance and improve the light sensitivity of the photosensitive resin, thereby improving the detailed morphology of the 3D printing product, and meanwhile improving the light energy utilization of the 3D printer.

Meanwhile, box thickness of the transmissive liquid crystal panel used by the 3D printer in the present embodiment is relatively small, preferably, the box thickness is in a range of 2.5 μm-3.0 μm, the dark-state transmittance of the transmissive liquid crystal panel is reduced, when the transmissive liquid crystal panel is used as a pattern mask in the 3D printing process, near ultraviolet light transmittance in dark state can be effectively reduced, so as to prevent the light sensitivity of the photosensitive resin at the invalid pattern, the quality of the printed pattern is improved, the service life of the photosensitive resin in the shaping slot is improved, waste of the photosensitive resin material is reduced, and meanwhile the 3D printing speed is effectively improved.

It is to be noted that, the above are merely the preferred embodiments of the present disclosure and the technical principles used. It will be understood by those skilled in the art that, the present disclosure is not limited to the specific embodiments described herein, various obvious modifications, readjustments and alternations may be made by those skilled in the art without departing from the scope of the present disclosure. Thus, although the present disclosure has been described in great detail by the above embodiments, the present disclosure is not limited to the above embodiments, without departing from the concept of the present disclosure, the present disclosure may include more other equivalent embodiments, however, the scope of the present disclosure is determined by the scope of the appended claims.

What is claimed is:

1. A transmissive liquid crystal panel, comprising:
   a first substrate, comprising a plurality of data lines and a plurality of scan lines, the plurality of data lines intersecting with the plurality of scan lines to define a plurality of pixels;
   a second substrate;
   a liquid crystal layer located between the first substrate and the second substrate;
   a black matrix, defining a plurality of aperture areas corresponding to the plurality of pixels;
   a monochromatic quantum dot layer, covering the aperture areas of the black matrix and being excitable under near ultraviolet light to generate light having a wavelength in a range of 385 nm-420 nm; and
   wherein the second substrate comprises a second base substrate, and the monochromatic quantum dot layer directly on the second base substrate facing the liquid crystal layer and covering the black matrix.

2. The transmissive liquid crystal panel as claimed in claim 1, wherein the monochromatic quantum dot layer is excitable under near ultraviolet light to generate light having a wavelength of 385 nm, 405 nm, or 420 nm.

3. The transmissive liquid crystal panel as claimed in claim 1, wherein a thickness of the liquid crystal layer is in a range of 2.5 μm-3.0 μm.

4. The transmissive liquid crystal panel as claimed in claim 1, wherein the first substrate further comprises a back-channel semiconductor thin film transistor, and the black matrix is located between the liquid crystal layer and the back-channel semiconductor thin film transistor and covers the back-channel semiconductor thin film transistor.

5. The transmissive liquid crystal panel as claimed in claim 4, wherein the first substrate further comprises a planarization layer and a pixel electrode, the planarization layer and the pixel electrode are sequentially located at a side of the back-channel semiconductor thin film transistor facing the liquid crystal layer, and the pixel electrode is connected with a drain electrode of the back-channel semiconductor thin film transistor via a through hole penetrating through the planarization layer;
   the black matrix is located at a side of the back-channel semiconductor thin film transistor facing the planarization layer.

6. The transmissive liquid crystal panel as claimed in claim 4, wherein the first substrate further comprises a planarization layer and a pixel electrode, the planarization layer and the pixel electrode are sequentially located at a side of the back-channel semiconductor thin film transistor facing the liquid crystal layer, and the pixel electrode is connected with a drain electrode of the back-channel semiconductor thin film transistor via a through hole penetrating through the planarization layer;
   the black matrix is located at a side of the pixel electrode facing the liquid crystal layer.

7. The transmissive liquid crystal panel as claimed in claim 5, wherein the first substrate further comprises a common electrode, and a horizontal electric field is formed between the common electrode and the pixel electrode.

8. The transmissive liquid crystal panel as claimed in claim 6, wherein the first substrate further comprises a common electrode, and a horizontal electric field is formed between the common electrode and the pixel electrode.

9. The transmissive liquid crystal panel as claimed in claim 5, wherein the second substrate further comprises a common electrode, and a vertical electric field is formed between the common electrode and the pixel electrode.

10. The transmissive liquid crystal panel as claimed in claim 6, wherein the second substrate further comprises a common electrode, and a vertical electric field is formed between the common electrode and the pixel electrode.

11. The transmissive liquid crystal panel as claimed in claim 1, wherein the black matrix is located at the second substrate, the first substrate further comprises a light-shading layer and a back-channel semiconductor thin film transistor, the light-shading layer is located between the liquid crystal layer and the back-channel semiconductor thin film transistor and covers the back-channel semiconductor thin film transistor.

12. The transmissive liquid crystal panel as claimed in claim 1, wherein the first substrate further comprises a first base substrate, a light-shading layer and a back-channel semiconductor thin film transistor, the light-shading layer and the back-channel semiconductor thin film transistor are located on the first base substrate, and the light-shading layer is located between the first base substrate and the back-channel semiconductor thin film transistor and covers the back-channel semiconductor thin film transistor.

13. The transmissive liquid crystal panel as claimed in claim 11, wherein the light-shading layer and the black matrix are made of a same material.

14. The transmissive liquid crystal panel as claimed in claim 12, wherein the light-shading layer and the black matrix are made of a same material.

15. A 3D printer, comprising a backlight source and a transmissive liquid crystal panel, the transmissive liquid crystal panel comprising:
   a first substrate, comprising a plurality of data lines and a plurality of scan lines, the plurality of data lines intersecting with the plurality of scan lines to define a plurality of pixels;
   a second substrate;
   a liquid crystal layer located between the first substrate and the second substrate;
   a black matrix, defining a plurality of aperture areas corresponding to the plurality of pixels;
   a monochromatic quantum dot layer, covering the aperture areas of the black matrix and being excitable under near ultraviolet light to generate light having a wavelength in a range of 385 nm-420 nm;
   wherein the second substrate comprises a second base substrate, and the monochromatic quantum dot layer directly on the second base substrate facing the liquid crystal layer and covering the black matrix; and
   wherein the backlight source emits near ultraviolet light having a single wavelength, and the near ultraviolet light emitted by the backlight source passes through the transmissive liquid crystal panel, so that the light having the wavelength in the range of 385 nm-420 nm is generated.

16. The 3D printer as claimed in claim 15, wherein the near ultraviolet light emitted by the backlight source passes through the transmissive liquid crystal panel, so that light having a wavelength of 385 nm, 405 nm, or 420 nm is generated.

17. The 3D printer as claimed in claim 15, further comprising a coating structure and a shaping slot, wherein the transmissive liquid crystal panel is located between the shaping slot and the backlight source.

\* \* \* \* \*